Dec. 14, 1926.
G. S. HODGES
LAWN MOWER
Filed August 22, 1919
1,610,444
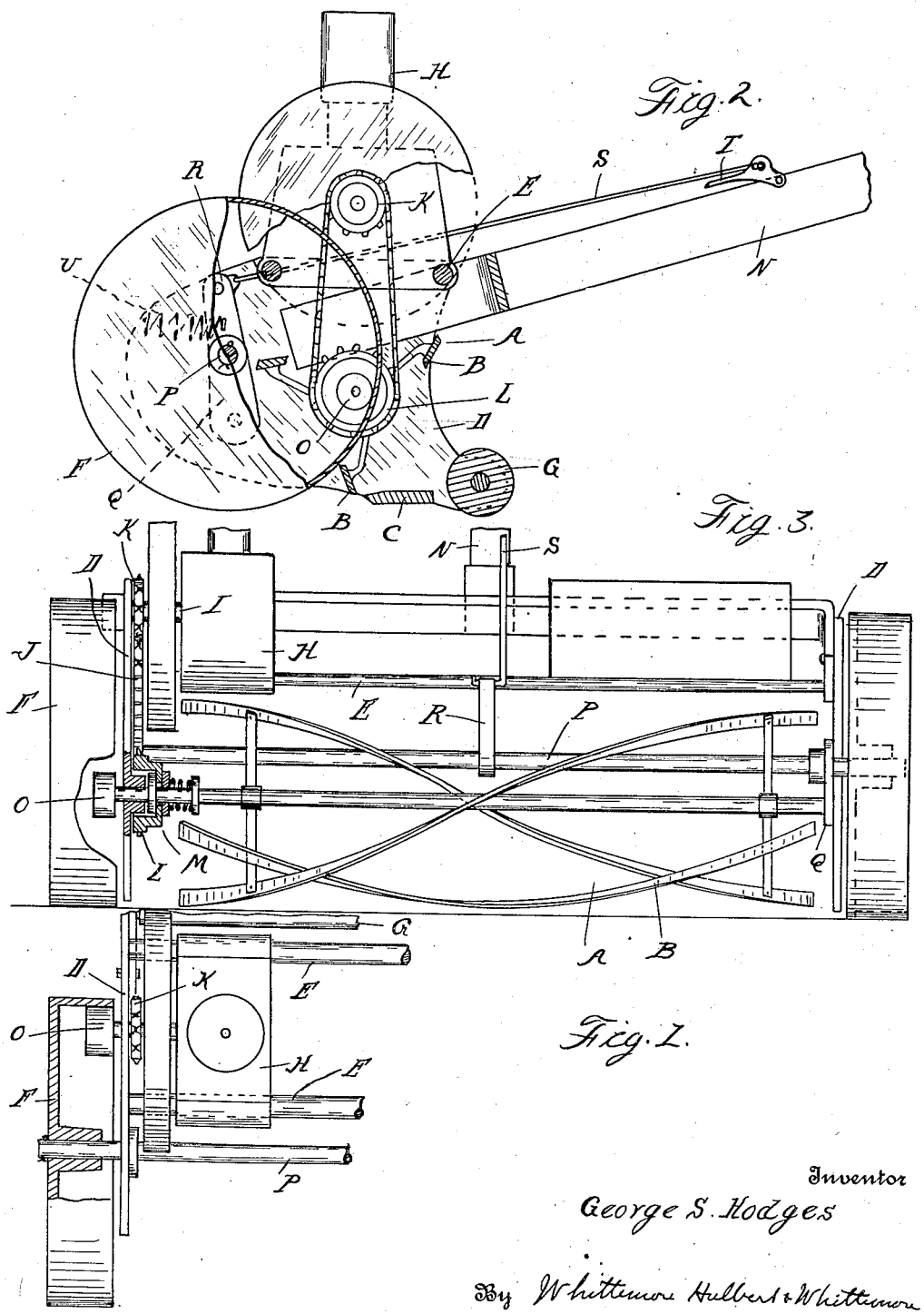
Inventor
George S. Hodges
By Whittemore Hulbert & Whittemore
Attorneys Patented Dec. 14, 1926.

1,610,444

UNITED STATES PATENT OFFICE.

GEORGE S. HODGES, OF PONTIAC, MICHIGAN, ASSIGNOR, BY DIRECT AND MESNE ASSIGNMENTS, TO THE MOTO-MOWER COMPANY, A CORPORATION OF MICHIGAN.

LAWN MOWER.

Application filed August 22, 1919. Serial No. 319,066.

The invention relates to lawn mowers more particularly designed for use upon lawns having shrubs, trees and other obstructions to be avoided. It is the object of the invention to obtain a construction which can be readily propelled and guided manually, but in which the power required for operating the cutter is derived from a motor. It is a further object to obtain a simple construction avoiding the weight and complication of power-operated mowers. Still further, it is an object to utilize the motor to assist in the propulsion of the machine on unobstructed areas without interfering with the complete manual control or preventing operation independently of the motor when desirable. It is also an object to provide for the resharpening of the blades at any time without the necessity of disassembling the mechanism or removal from the field.

With these and other objects, the invention comprises the novel construction as hereinafter set forth.

In the drawings:

Figure 1 is a sectional plan view of the mower;

Figure 2 is a vertical longitudinal section;

Figure 3 is a sectional front elevation.

In the present state of the art various constructions of power-actuated mowers have been devised, but these usually involve a considerable increase in weight over the hand mowers, as well as complicated mechanism for transmission of the power to both the cutter and the propulsion wheels. While such devices are very useful in large fields and unobstructed areas, it is difficult to make use of the same upon lawns which are obstructed by shrubs, trees, walks, etc., or where the ground is rolling or terraced. On the other hand, the use of a hand-operated mower involves the expenditure of both labor and time, the former being largely due to the step-up gearing for revolving the cutter at sufficiently high velocity from the ground wheels, and the time element being due to the necessary restriction in width of a machine which has to be manually operated.

With my improved construction I dispense with gearing or other transmission mechanism between the ground wheels and cutter and drive the latter at high velocity directly from a comparatively low powered motor. This decreases the power required for propelling the machine over a lawn to such an extent that a much wider cutter may be employed, which will perform its work in a correspondingly shorter time. The higher the velocity of rotation of the cutter the greater its efficiency, and the less the power required for its operation, and thus a small, light and low-powered motor is all that is required. On the other hand, by providing a friction drive pulley on the end of the cutter shaft, together with means for contacting the same with the ground wheels, the power of the motor may be used to assist in transporting the mower.

In detail, A is a revolving cutter, preferably having the spirally-arranged blades B usual in lawn mowers, and C is the cooperating stationary knife bar. These parts are mounted upon a light frame, preferably comprising side plates D and cross bars E. The machine is also provided with the ground wheels F at opposite ends of the cutter and with a rear roller G for adjustment of the height of the cut as is usual in the hand-operated machines.

Upon the frame, and preferably secured to the cross bars E thereof, is mounted a motor H for which I preferably employ a two-cycle explosion engine. The crank shaft I of this motor is provided with a suitable driving connection to the shaft X of the cutter, such as the belt or chain J, engaging the pulleys or sprockets K and L. It is, however, desirable to avoid a positive connection which might result in the breaking of the cutter upon striking a stone or other obstruction and I have, therefore, provided a friction clutch such as indicated at M.

With the construction as thus far described, whenever the engine is started, it will drive the cutter at high velocity and if the operator then propels the machine by the handle N, he can easily guide and control its operation. As there is no relation between the speed of movement over the ground and the speed of revolution of the cutter, the mower may be moved slowly in heavy grass and at a greater speed where the work is lighter. There is also no danger of running the machine into shrubs, or other obstructions. Inasmuch, however, as there are always unobstructed areas, I have provided means for assisting in the forward movement of the machine by the motor, this consisting in friction pulleys O on the outer ends of the cutter shaft X and which are adapted to engage peripheral flanges of the ground wheels on the inner surface thereof. To permit of this engagement the wheels F are preferably journaled on the shaft P, which is mounted on rock arms Q fulcrumed on the frame and actuated by the rock arm R, rod S and lever T on the handle. One or more springs U are arranged to yieldably rock the arms Q in a direction to press the peripheral flanges of the ground wheels F against the pulleys O when the lever T is in one position of adjustment, but upon the movement of said lever to its opposite position, the spring U is placed under tension and the peripheral flanges of the ground wheels are withdrawn from contact. Thus, the operator is permitted to make use of the power in assisting propulsion whenever this is feasible, but at other times the cutter shaft and ground wheels are entirely independent of each other.

A mower to do good work must be frequently sharpened and this sharpening may be effected by rotating the cutter backwards and by placing an abrasive material upon the stationary bar C. With my improved construction the motor being two-cycle is reversible, so that at any time the blades may be sharpened.

The batteries, coil and control switch and other accessories may be conveniently mounted upon the frame and as indicated are enclosed in the housing V.

In use, the motor is started and through the chain or belt J will drive the cutter shaft at high velocity. The operator then pushes the machine to advance the same and can regulate his movements by the character of the grass to be cut and the objects to be avoided. Whenever there is an unobstructed stretch, the lever P may be adjusted to release the rock arm R, permitting the springs U to yieldably press the peripheral flanges of the ground wheels F against the frictional pulleys O. This will drive the wheels to assist in the propulsion of the machine, but the movement can still be controlled by the operator and the power drive thrown off whenever desired.

What I claim as my invention is:

1. A lawn mower, comprising a rotary cutter, a frame on which said cutter is mounted, a motor also mounted on said frame and directly driving said cutter at high velocity, ground wheels swingingly mounted on said frame and means under the control of the operator for driving the ground wheels non-positively by the motor.

2. A lawn mower, comprising a frame, a handle on said frame for manually operating the same, a rotary cutter mounted on said frame, a motor also mounted on said frame, and connected to said cutter to drive the same at high velocity, a friction pulley at the end of said cutter, a ground wheel movable bodily toward and away from said friction pulley, and means for yieldably pressing said ground wheel into engagement with said friction pulley to assist in the propulsion of the machine.

3. A lawn mower comprising a frame, a rotary cutter having a shaft journalled in said frame, a motor mounted on said frame for directly driving said cutter, a member carried by said cutter shaft, rock arms carried by said frame, a shaft journalled in said rock arms, ground engaging wheels mounted on the last-mentioned shaft, and means for actuating said rock arms to move said wheels into frictional engagement with said member for driving the ground wheels from the motor.

4. A lawn mower comprising a frame, a rotary cutter having a shaft journalled in the frame, a motor mounted on the frame for directly driving said cutter, a swingingly mounted shaft, a member carried by said cutter shaft, ground wheels carried by said swingingly mounted shaft, and means for swinging said shaft to cause said wheels to frictionally engage said member for driving the ground wheels from the motor.

5. A lawn mower comprising a frame, a rotary cutter having a shaft journalled in said frame, a motor mounted on said frame for directly driving said cutter, a member carried by said cutter shaft, rock arms carried by said frame, a shaft journalled in said rock arms, ground engaging wheels mounted on the last-mentioned shaft, means including a rod connected to one of the rock arms for moving said wheels into frictional engagement with said member for driving the ground wheels from said motor, and yieldable means for operating said wheels and member.

6. In a lawn mower, a frame, a cutter having a shaft rotatably mounted on the frame, a flange on the shaft, a pinion on the shaft frictionally engageable with the flange to drive the cutter shaft, yieldable means normally maintaining said pinion and flange in frictional engagement, and a motor mounted on the frame for directly driving said pinion.

7. A lawn mower comprising a frame, a cutter journaled upon said frame, a motor carried by said frame and connected to said cutter to operate the latter at high velocity, a friction member at one end of said cutter, a pair of ground wheels, a shaft mounting said ground wheels movable to and from said friction member to control driving engagement of said friction member with one of said ground wheels, and means yieldably urging the ground wheel shaft toward said friction member.

8. A hand propelled lawn mower including a frame, ground engaging wheels supporting said frame, a rotary cutter carried by the frame, a motor on the frame for driving the cutter, and a manually controlled driving connection between the cutter and ground wheels including means for changing the axis of the latter relatively to the axis of the cutter.

9. A lawn motor comprising a frame, a rotary cutter carried by said frame, a motor on the frame and connected to said cutter to drive the same, a friction pulley fixed upon the cutter, ground wheels for said frame manually engaging said pulley so as to be driven thereby, and means for shifting said ground wheels bodily away from said pulley to render the latter inoperative for driving said wheels.

In testimony whereof I affix my signature.

GEORGE S. HODGES.